United States Patent
Zhao

(10) Patent No.: US 9,904,085 B2
(45) Date of Patent: Feb. 27, 2018

(54) CURVED-SURFACE LIQUID CRYSTAL DISPLAY

(71) Applicant: BOE TECHNOLOGY GROUP CO., LTD., Beijing (CN)

(72) Inventor: Weili Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/200,209

(22) Filed: Jul. 1, 2016

(65) Prior Publication Data
US 2017/0123257 A1   May 4, 2017

(30) Foreign Application Priority Data

Oct. 30, 2015   (CN) .......................... 2015 1 0727484

(51) Int. Cl.
*G02F 1/1333* (2006.01)

(52) U.S. Cl.
CPC .................. *G02F 1/133308* (2013.01); *G02F 2001/13332* (2013.01); *G02F 2001/133331* (2013.01)

(58) Field of Classification Search
CPC ... G02F 2001/133331; G02F 1/133308; G02F 2201/56; G02F 2201/46
See application file for complete search history.

(56) References Cited

U.S. PATENT DOCUMENTS

| | | | |
|---|---|---|---|
| 9,625,131 B2 * | 4/2017 | Kim | G02B 6/0088 |
| 2007/0139605 A1 * | 6/2007 | Matsuda | G02F 1/133308 |
| | | | 349/158 |
| 2007/0146569 A1 * | 6/2007 | Nouchi | G02B 6/0088 |
| | | | 349/58 |

(Continued)

FOREIGN PATENT DOCUMENTS

| CN | 102879949 | 1/2013 |
|---|---|---|
| CN | 104977746 | 10/2015 |

(Continued)

OTHER PUBLICATIONS

Machine translation of CN 205485157 U.*

*Primary Examiner* — Joseph L Williams
*Assistant Examiner* — Jose M Diaz
(74) *Attorney, Agent, or Firm* — Harness, Dickey & Pierce, P.L.C.

(57) ABSTRACT

The disclosure relates to a curved-surface liquid crystal display, comprising a backplane, a backlight module, a liquid crystal display panel and a frame, the backlight module and the liquid crystal display panel both being of a planar structure, the backlight module being provided within the backplane, the liquid crystal display panel being provided on the light emergent side of the backlight module, the curved-surface liquid crystal display further comprising a cover plate fixed onto the liquid crystal display panel through the frame, the cover plate comprising a first surface deviating from the liquid crystal display panel and a second surface facing the liquid crystal display panel, the first (Continued)

surface being concave. The curved-surface liquid crystal display provided by the disclosure implements the curved-surface design with the cover plate having a curved-surface structure, further avoiding the problem of light leak caused by the bending of the liquid crystal display panel.

19 Claims, 4 Drawing Sheets

(56) References Cited

U.S. PATENT DOCUMENTS

| | | | |
|---|---|---|---|
| 2007/0146616 A1* | 6/2007 | Nouchi | G02F 1/1333 349/155 |
| 2015/0138484 A1* | 5/2015 | Watanabe | G02F 1/133308 349/58 |
| 2015/0219324 A1* | 8/2015 | Kim | G02F 1/133305 349/58 |
| 2015/0268507 A1* | 9/2015 | Hsiao | G02F 1/133308 349/58 |
| 2016/0085112 A1* | 3/2016 | Takase | F21V 15/01 349/58 |
| 2016/0370639 A1* | 12/2016 | Que | G02B 6/0055 |
| 2016/0370644 A1* | 12/2016 | Wang | G02F 1/133526 |
| 2017/0045771 A1* | 2/2017 | Choi | G02F 1/13336 |

FOREIGN PATENT DOCUMENTS

| | | | | |
|---|---|---|---|---|
| CN | 205485157 U | * | 8/2016 | |
| CN | 205679890 U | * | 11/2016 | |
| JP | 2000259084 | | 9/2000 | |
| WO | WO 2014192345 A1 | * | 12/2014 | F21V 15/01 |

\* cited by examiner

CURVED-SURFACE LIQUID CRYSTAL DISPLAY

CROSS-REFERENCE TO RELATED APPLICATION

This application claims the benefit and priority of Chinese Patent Application No. 201510727484.4 filed Oct. 30, 2015. The entire disclosure of the above application is incorporated herein by reference.

FIELD

The present disclosure relates to the field of display technology, and particularly, to a curved-surface liquid crystal display.

BACKGROUND

This section provides background information related to the present disclosure which is not necessarily prior art.

As display technology continues to develop, people have increasingly high visual demands for display products, and curved-surface display products have gradually become the trend of development.

Existing curved-surface display products are mainly curved-surface liquid crystal displays, and components of a liquid crystal display generally include backlight module, liquid crystal display panel, backplane and frame. The backlight module and the liquid crystal display panel are fixed into a cavity formed the backplane and the frame.

In the prior art, in the realization of a curved-surface design, usually a method of bending a liquid crystal display panel into a certain arc and mating with a curved-surface backlight module is used. However, in a liquid crystal display using IPS (In Plane Switching) and ADS (Advanced Super Dimension Switch) mode, the bending of the liquid crystal display panel may cause glass substrates on both sides of the liquid crystal to deform, resulting in changes in polarization state of light, further light leakage issues arising. In addition, to achieve bending, the liquid crystal display panel also exists force problem due to glass tensile and compression, the peripheral portions of the crystal display panel with concentrated stress also leak light severely.

SUMMARY

This section provides a general summary of the disclosure, and is not a comprehensive disclosure of its full scope or all of its features.

Embodiments described herein provides a curved-surface liquid crystal display.

In one embodiment, a curved-surface liquid crystal display comprises: a backplane, a backlight module, a liquid crystal display panel and a frame, the backlight module and the liquid crystal display panel both being of a planar structure, the backlight module being provided within the backplane, the liquid crystal display panel being provided on the light emergent side of the backlight module, the curved-surface liquid crystal display further comprising a cover plate fixed onto the liquid crystal display panel through the frame, the cover plate comprising a first surface deviating from the liquid crystal display panel and a second surface facing the liquid crystal display panel, the first surface being concave.

In one example, a set of opposite sides of the frame are straight sides and the other set of opposite sides are curved sides.

In one example, the curvature radius of the curved sides of the frame are the same as that of the first surface.

In one example, the shape of the frame matches with the shape of edges of the first surface where the frame is located.

In one example, the second surface is convex.

In one example, the curvature radius of the second surface is equal to that of the first surface.

In one example, the curvature radius of the second surface is smaller than that of the first surface.

In one example, the curved-surface liquid crystal display further comprises a support member, which is of a strip structure, and is provided along at least two opposite sides of the frame and located between the frame and the liquid crystal display panel.

In one example, the cover plate is sandwiched between the support member and the frame.

In one example, the curved-surface liquid crystal display further comprises a fixing plate, which fixes the cover plate onto the frame.

In one example, the fixing plate and the frame form a groove structure, and the cover plate is fixed into the groove structure.

In one example, the second surface is planar.

In a further example, the second surface is attached to the liquid crystal display panel, and the cover plate is sandwiched between the frame and the liquid crystal display panel.

In one example, there is a gap between the cover plate and the liquid crystal display panel.

In the example in which the second surface is convex, the curved-surface liquid crystal display further comprises a support member, which is provided along at least two opposite edges of the second surface of the cover plate and located between the cover plate and the liquid crystal display panel.

In one example, the shape of the support member matches with the shape of the second surface.

In the example in which the curvature radius of the second surface is equal to that of the first surface, the curved-surface liquid crystal display further comprises a support member, which is provided along at least two opposite edges of the second surface of the cover plate and located between the cover plate and the liquid crystal display panel.

In the example in which the curvature radius of the second surface is smaller than that of the first surface, the curved-surface liquid crystal display further comprises a support member, which is provided along at least two opposite edges of the second surface of the cover plate and located between the cover plate and the liquid crystal display panel.

In the example in which the curvature radius of the second surface is equal to that of the first surface, the curved-surface liquid crystal display further comprises a fixing plate, which fixes the cover plate onto the frame.

In the example in which the curvature radius of the second surface is smaller than that of the first surface, the curved-surface liquid crystal display further comprises a fixing plate, which fixes the cover plate onto the frame.

With the backlight module and the liquid crystal display panel having a planar structure and the cover plate having a first surface in the form of concave, the curved-surface design of the liquid crystal display is implemented, thus avoiding the problem that the liquid crystal display panel leaks light as a result of the bending of the liquid crystal display panel.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

To make the purpose, technical solutions, and advantages of the present disclosure clearer, embodiments of the present disclosure will be further described in detail with reference to the drawings.

Figure 1:
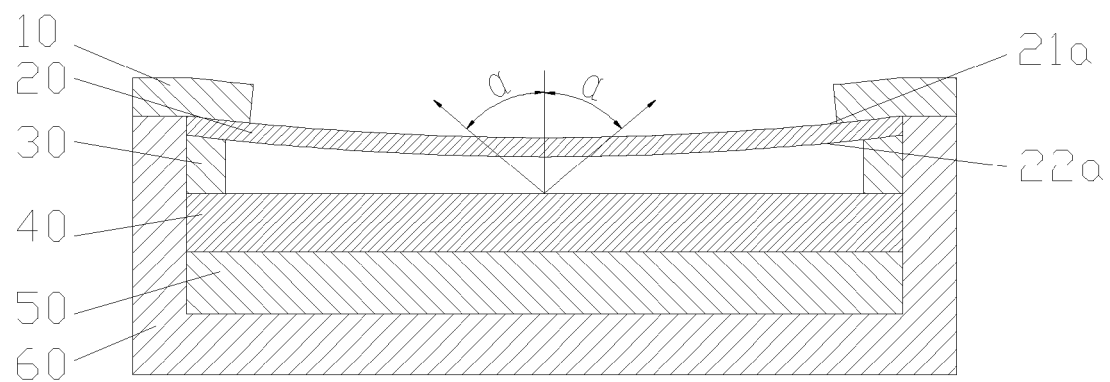
FIG. 1 is a schematic structural diagram of a curved-surface liquid crystal display provided in an embodiment as described herein.

There is provided a curved-surface liquid crystal display in embodiments described herein. As shown in FIG. 1, the curved-surface liquid crystal display comprises: a backplane 60, a backlight module 50, a liquid crystal display panel 40, a cover plate 20 and a frame 10, the backlight module 50 and the liquid crystal display panel 40 both being of a planar structure, the backlight module 50 being provided within the backplane 60, the liquid crystal display panel 40 being provided on the light emergent side of the backlight module 50, the cover plate 20 being fixed onto the liquid crystal display panel through the frame 10, the cover plate 20 comprising a first surface 21a deviating from the liquid crystal display panel 40 and a second surface 22a facing the liquid crystal display panel 40, the first surface 21a being concave.

In the curved-surface liquid crystal display as shown in FIG. 1, the second surface 22a is a convex surface, and the curvature radius of the second surface 22a is equal to the curvature radius of the first surface 21a.

In this embodiment, referring to FIG. 1, light (indicated by the arrows in FIG. 1) is irradiated from the side of the liquid crystal display panel 40 onto the second surface 22a of the cover plate 20, and since the first surface 21a and the second surface 22a of the cover plate 20 have an equal curvature radius, light does not change in its propagation direction after passing through the cover plate 20, and the viewing angle α of the curved-surface liquid crystal display has not changed.

In the embodiment described in this disclosure, the backlight module 50 with a planar structure and the liquid crystal display panel 40 with a planar structure are installed in the backplane 60, and the cover plate 20 having the first surface 21a with a concave structure is provided on the liquid crystal display panel 40. Light emitted from the backlight module 50 transmits through the liquid crystal display panel 40, and then is refracted by the cover plate 20 having the first surface 21a with a concave structure, so that light is emitted out from the first surface 21a, thereby achieving the curved-surface displaying of the liquid crystal display. In the embodiment described in this disclosure, the backlight module 50 and the liquid crystal display panel 40 adopt a planar design, to avoid the light leakage problem caused by the bending of the liquid crystal display panel.

In applications, the cover plate 20 may use a transparent resin material, and also may use glass or other transparent material. The thickness of the cover plate may be 0.1 cm~1 cm.

Alternatively, the cover plate 20 may be an arc shaped plate, i.e., the shapes of the first surface 21a and the second surface 22a of the cover plate 20 may be made directly in the manufacturing process. The cover plate 20 also may be a flat plate, and is forced to bend by squeezing the cover plate 20 in the installation process, so that its first surface 21a is concave.

Figure 2:
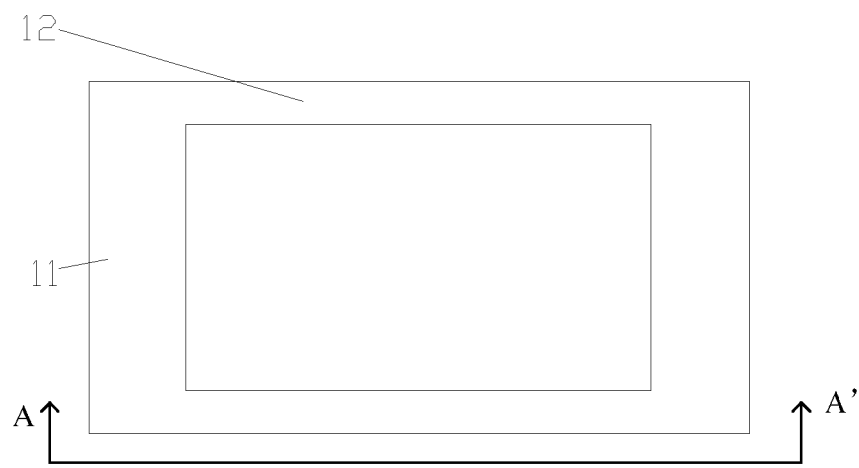
FIG. 2 is a top view of a frame of a curved-surface liquid crystal display provided in an embodiment as described herein.
Figure 3:
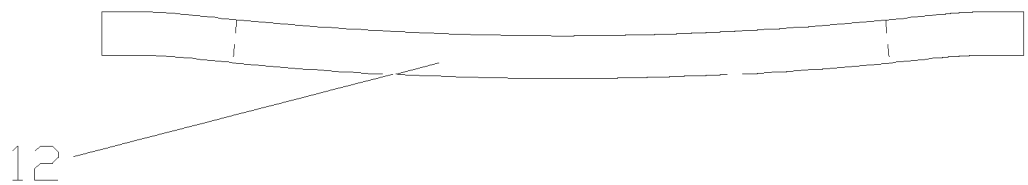
FIG. 3 is a side view of FIG. 2 taken along the AA' direction.

FIG. 2 is a top view of the frame 10 in the present embodiment, FIG. 3 is a side view of the frame 10 in the present embodiment along the AA' direction in FIG. 2. As can be seen from FIGS. 2 and 3, the frame 10 comprises four sides sequentially connected end to end, in which two opposite sides are straight sides 11, and the other two opposite sides are curved sides 12. The frame 10 may be fixed with screw on the backplane 60, and may also be fixed on the backplane 60 in other ways.

In one example, the curvature radius of two curved sides 12 of the frame 10 is the same as that of the first surface 21a, and specifically, the shape of the frame 10 mates with that of edges of the first surface where the frame is located, such that the frame 10 fits the cover plate 20 better, to prevent structure loosening.

In one embodiment, the curved-surface liquid crystal display further comprises two support members 30, and the support members 30 are of a strip structure. The support members 30 are provided 11 along the straight sides of the frame and located between the frame 10 and the liquid crystal display panel 40. The support members 30 can prevent the liquid crystal display panel 40 and the backlight module 50 from being loosened. Further, the support members 30 are provided on the straight sides of the frame 11, without bending, and therefore the structure thereof is simple and easy to manufacture and install.

It should be noted that, in other alternative embodiments, the support members 30 also may be provided along the curved sides 12, and accordingly, the cover plate 20 is sandwiched between the support member 30 and the curved side 12. In another alternative embodiment, there may be provided four support members 30, among which two are provided along the straight sides 11 and the other two are provided along the curved sides 12, and such an arrangement can fix the cover plate 20 better.

Specifically, a pair of opposite surfaces of the support member 30 are attached to the light emergent surface of the liquid crystal display panel 40 and the second surface 22a of the cover place 20, respectively, while the support member 30 also is attached to the side wall of the backplane 60, and the shape of the surface of the support member 30 in contact with the cover plate 20 matches with that of the cover plate. With such configuration, the support members 30 and the cover plate 20 can be effectively prevented from being loosened.

As shown in FIG. 1, in the present embodiment, there may be a gap left between the cover plate 20 and the liquid crystal display panel 40, to prevent the cover plate 20 from squeezing the liquid crystal display panel 40.

Figure 4:
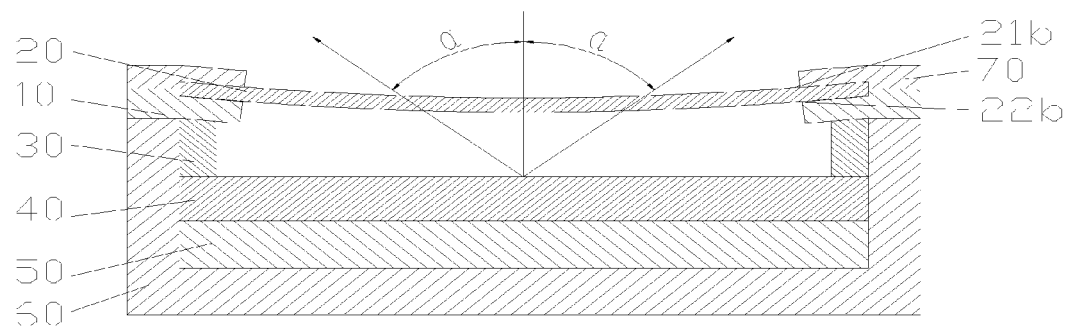
FIG. 4 is a schematic structural diagram of a curved-surface liquid crystal display provided in a first variant embodiment.

FIG. 4 shows a schematic structural diagram of a curved-surface liquid crystal display provided in a first variant embodiment. As shown in FIG. 4, the structure of the curved-surface liquid crystal display shown in FIG. 4 is substantially the same as that of the curved-surface liquid crystal display shown in FIG. 1, except that, in the present embodiment, the cover plate 20 is fixed on the frame 10 by a fixing plate 70, i.e., the cover plate 20 is provided between the fixing plate 70 and the frame 10; and in the embodiment shown in FIG. 1, the cover plate 20 is sandwiched between the support member 30 and the frame 10, that is, the cover plate 20 is provided below the frame 10.

Figure 5:
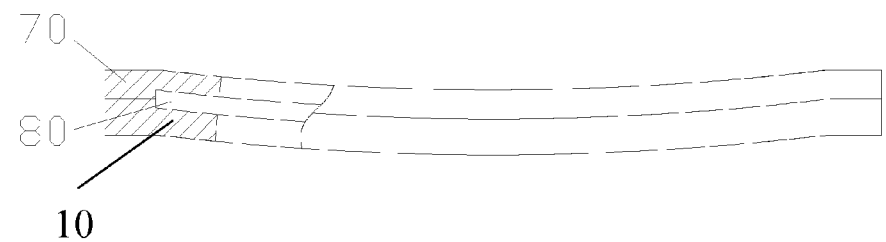
FIG. 5 is a schematic view of the fixing plate of the curved-surface liquid crystal display provided in the first variant embodiment mating with the frame.

FIG. 5 shows a form in which the fixing plate 70 mates with the frame 10. Four sides of the fixing plate 70 are connected end to end, and the fixing plate 70 is provided to adapt to the frame 10. The sectional portion of FIG. 5 shows that the fixing plate 70 attaching to the frame 10 forms a groove structure 80.

It should be noted that, the fixing plate 70 also may include only two sides provided along the straight sides 11, or only two sides provided along the curved sides 12.

Referring again to FIG. 4, the frame 10 and the fixing plate 70 may be fixed with screw on the backplane 60, and also may be fixed in other forms. The cover plate 20 is sandwiched in the groove structure 80 between the frame 10 and the fixing plate 70. The inner wall of the groove structure 80 fits the first surface 21b and the second surface 22b of the cover plate 20, and the frame 10 and the fixing plate 70 together play a role in securing the cover plate 20 and can effectively prevent the cover plate 20 from being loosened. Similar to the embodiment shown in FIG. 1, in this embodiment, a gap may be left between the cover plate 20 and the liquid crystal display panel 40 to prevent the liquid crystal display panel 40 from being squeezed by the cover plate 20.

In the present embodiment, the support member 30 is provided between the frame 10 and the liquid crystal display panel 40, the upper and lower surfaces of the support member 30 are attached to the liquid crystal display panel 40 and the frame 10 respectively, while the support member 30 also is attached to the backplane 60. With this configuration, the support member 30 can effectively prevent the liquid crystal display panel 40 and the backlight module 50 from being loosened.

It should be further noted that, in the present embodiment, the shapes of the surfaces of the support member 30 and the frame 10 in contact with each other mate, and can effectively prevent the support member 30 from being loosened.

Referring again to FIG. 4, light (indicated by the arrows in FIG. 4) is irradiated from the light emergent side of the liquid crystal display panel 40 onto the second surface 22a of the cover plate 20, and since the first surface 21b and the second surface 22b of the cover plate 20 have an equal curvature radius, light does not change in its propagation direction after passing through the cover plate 20, thereby the viewing angle α of the curved-surface liquid crystal display has not changed.

Figure 6:
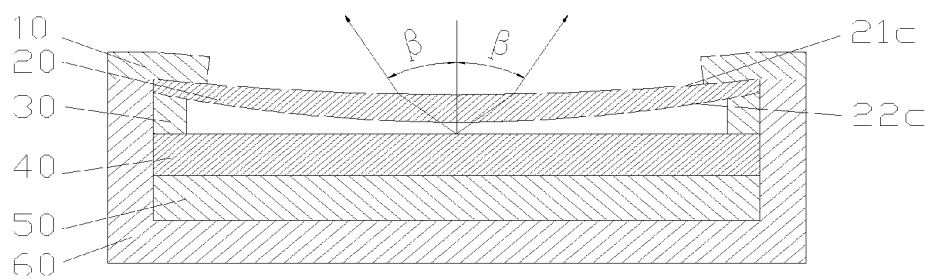
FIG. 6 is a schematic structural diagram of a curved-surface liquid crystal display provided in a second variant embodiment.

FIG. 6 shows a schematic structural diagram of a curved-surface liquid crystal display provided in a second variant embodiment. As shown in FIG. 6, the structure of the curved-surface liquid crystal display shown in FIG. 6 is substantially the same as the structure of the curved-surface liquid crystal display shown in FIG. 1, except that, in the embodiment shown in FIG. 1, the curvature radius of the second surface 22a of the cover plate 20 is equal to that of the first surface 21a, while in this embodiment, the curvature radius of the second surface 22c of the cover plate 20 is smaller than that of the first surface 21c, and the cover plate 20 thus exhibits a convex lens structure with one surface being concave and the other surface being convex.

Referring to FIG. 6, light (indicated by the arrows in FIG. 6) is irradiated from the light emergent side of the liquid crystal display panel 40 onto the second surface 22c of the cover plate 20. Light will be refracted when passing through the cover plate 20, and due to the convex lens structure of the cover plate 20, the cover plate 20 converges light, so that after light is emitted out from the first surface 21c, the viewing angle β is smaller than the viewing angle α (see FIG. 1), thus narrowing the viewing angle of the curved-surface liquid crystal display.

Figure 7:
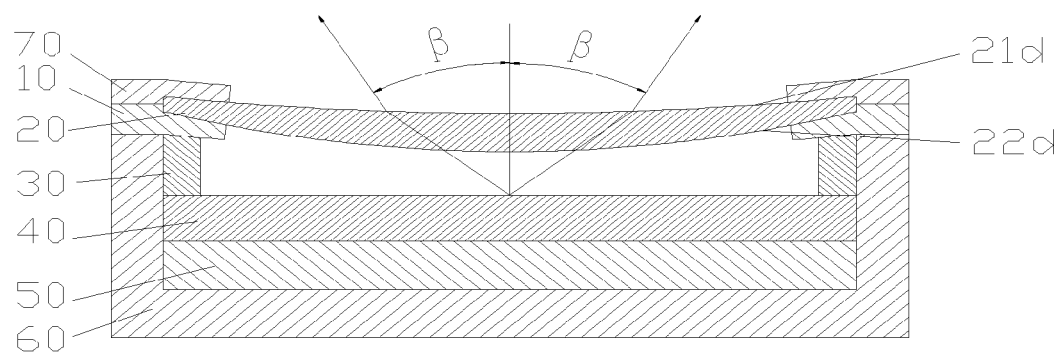
FIG. 7 is a schematic structural diagram of a curved-surface liquid crystal display provided in a third variant embodiment.

FIG. 7 is a schematic structural diagram of a curved-surface liquid crystal display provided in a third variant embodiment. As shown in FIG. 7, the structure of the curved-surface liquid crystal display shown in FIG. 7 is substantially the same as the structure of the curved-surface liquid crystal display shown in FIG. 4, except that, in the embodiment as shown in FIG. 4, the curvature radius of the second surface 22b of the cover plate 20 is equal to that of the first surface 21b, while in this embodiment, the curvature radius of the second surface 22d of the cover plate 20 is smaller than that of the first surface 21d, and the cover plate 20 thus exhibits a convex lens structure with one surface being concave and the other surface being convex.

Referring to FIG. 7, light (indicated by the arrows in FIG. 7) is irradiated from the light emergent side of the liquid crystal display panel 40 onto the second surface 22d of the cover plate 20. Light will be refracted when passing through the cover plate 20, and due to the convex lens structure of the cover plate 20, the cover plate 20 converges light, so that after light is emitted out from the first surface 21d, the viewing angle β is smaller than the viewing angle α (see FIG. 1), thus narrowing the viewing angle of the curved-surface liquid crystal display.

Figure 8:
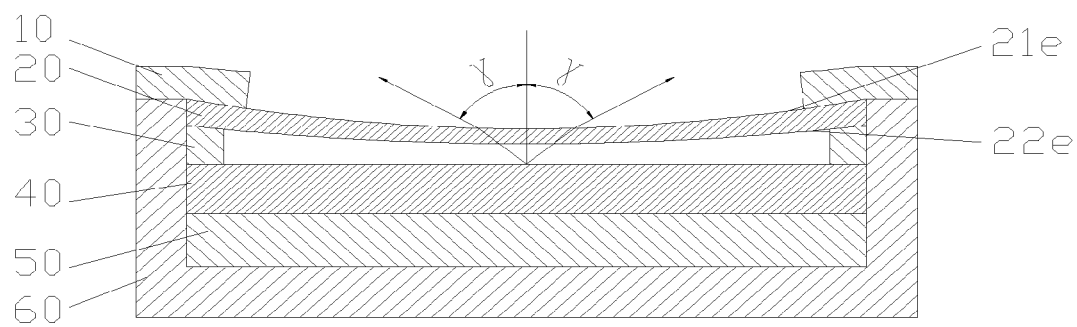
FIG. 8 is a schematic structural diagram of a curved-surface liquid crystal display provided in a fourth variant embodiment.

FIG. 8 is a schematic structural diagram of a curved-surface liquid crystal display provided in a fourth variant embodiment. As shown in FIG. 8, the structure of the curved-surface liquid crystal display shown in FIG. 8 is substantially the same as the structure of the curved-surface liquid crystal display shown in FIG. 1, except that, in the embodiment as shown in FIG. 1, the curvature radius of the second surface 22a of the cover plate 20 is equal to that of the first surface 21a, while in this embodiment, the curvature radius of the second surface 22e of the cover plate 20 is larger than that of the first surface 21e, and the cover plate 20 thus exhibits a concave lens structure with one surface being concave and the other surface being convex.

Referring to FIG. 8, light (indicated by the arrows in FIG. 8) is irradiated from the light emergent side of the liquid crystal display panel 40 onto the second surface 22e of the cover plate 20. Light will be refracted when passing through the cover plate 20, and due to the concave lens structure of the cover plate 20, the cover plate 20 spreads light, so that after light is emitted out from the first surface 21e, the viewing angle γ is larger than the viewing angle α (see FIG. 1), thus enlarging the viewing angle of the curved-surface liquid crystal display.

Figure 9:
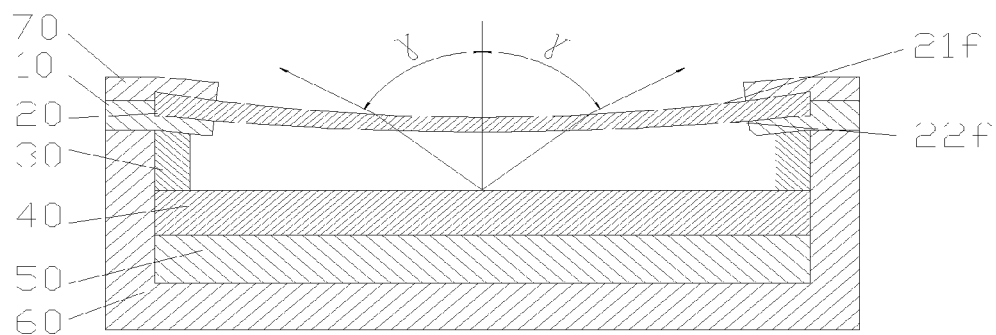
FIG. 9 is a schematic structural diagram of a curved-surface liquid crystal display provided in a fifth variant embodiment.

FIG. 9 is a schematic structural diagram of a curved-surface liquid crystal display provided in a fifth variant embodiment. As shown in FIG. 9, the structure of the curved-surface liquid crystal display shown in FIG. 9 is substantially the same as the structure of the curved-surface liquid crystal display shown in FIG. 4, except that, in the embodiment as shown in FIG. 4, the curvature radius of the second surface 22b of the cover plate 20 is equal to that of the first surface 21b, while in this embodiment, the curvature radius of the second surface 22f of the cover plate 20 is larger than that of the first surface 21f, and the cover plate 20 thus exhibits a concave lens structure with one surface being concave and the other surface being convex.

Referring to FIG. 9, light (indicated by the arrows in FIG. 9) is irradiated from the light emergent side of the liquid crystal display panel 40 onto the second surface 22f of the cover plate 20. Light will be refracted when passing through the cover plate 20, and due to the concave lens structure of the cover plate 20, the cover plate 20 spreads light, so that after light is emitted out from the first surface 21f, the viewing angle γ is larger than the viewing angle α (see FIG. 1), thus enlarging the viewing angle of the curved-surface liquid crystal display.

Figure 10:
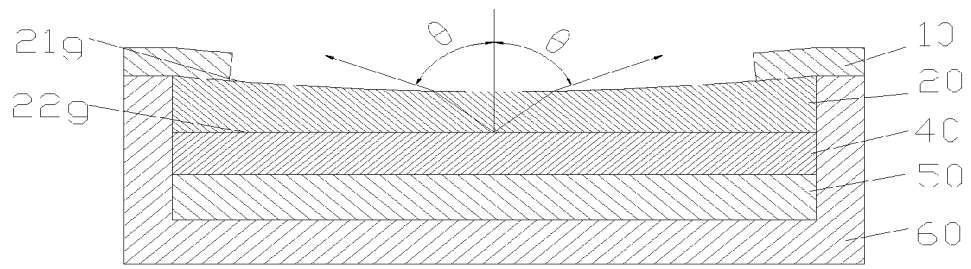
FIG. 10 is a schematic structural diagram of a curved-surface liquid crystal display provided in a sixth variant embodiment.

FIG. 10 is a schematic structural diagram of a curved-surface liquid crystal display provided in a sixth variant embodiment. As shown in FIG. 10, the structure of the curved-surface liquid crystal display shown in FIG. 10 is substantially the same as the structure of the curved-surface liquid crystal display shown in FIG. 1, except that, in the embodiment as shown in FIG. 1, the curvature radius of the second surface 22a of the cover plate 20 is equal to that of the first surface 21a, while in this embodiment, the second surface 22g of the cover plate 20 is planar (that is, the curvature radius thereof is extremely large, and the curvature radius of the second surface 22g is larger than that of the first surface 21g), and meanwhile the support member 30 is removed.

In the embodiment, the second surface 22g of the cover plate 20 is planar, and the cover plate 20 exhibits a concave lens structure with one surface being concave and the other surface being planar. The cover plate 20 is sandwiched directly between the frame 10 and the liquid crystal display panel 40. That is, the second surface 22g is attached to the liquid crystal display panel 40, the first surface 21g is attached to the frame 10, which can play the role of fixing the liquid crystal display panel 40 and supporting the frame 10, thereby the structure of the curved-surface liquid crystal display of the present embodiment is simpler.

Referring to FIG. 10, light (indicated by the arrows in FIG. 10) is irradiated from the light emergent side of the liquid crystal display panel 40 onto the second surface 22g of the cover plate 20. Light will be refracted when passing through the cover plate 20, and due to the concave lens structure of the cover plate 20, the cover plate 20 spreads light, so that after light is emitted out from the first surface 21g, the viewing angle θ is larger than the viewing angle α (see FIG. 1), thus enlarging the viewing angle of the curved-surface liquid crystal display.

For purposes of the description hereinafter, the terms "upper", "lower", "right", "left", "vertical", "horizontal", "top", "bottom", and derivatives thereof shall relate to the invention, as it is oriented in the drawing figures. The terms "overlying", "atop", "positioned on" or "positioned atop" means that a first element, such as a first structure, is present on a second element, such as a second structure, wherein intervening elements, such as an interface structure, e.g. interface layer, may be present between the first element and the second element. The term "direct contact" means that a first element, such as a first structure, and a second element, such as a second structure, are connected without any intermediary conducting, insulating or semiconductor layers at the interface of the two elements.

As used herein and in the appended claims, the singular form of a word includes the plural, and vice versa, unless the context clearly dictates otherwise. Thus, the references "a", "an", and "the" are generally inclusive of the plurals of the respective terms. Similarly, the words "comprise", "comprises", and "comprising" are to be interpreted inclusively rather than exclusively. Likewise, the terms "include", "including" and "or" should all be construed to be inclusive, unless such a construction is clearly prohibited from the context. Where used herein the term "examples," particularly when followed by a listing of terms is merely exemplary and illustrative, and should not be deemed to be exclusive or comprehensive.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A curved-surface liquid crystal display comprising a backplane, a backlight module, a liquid crystal display panel, a frame, and a cover plate fixed onto the liquid crystal display panel through the frame, wherein the backlight module and the liquid crystal display panel both are of a planar structure, the backlight module is provided within the backplane, and the liquid crystal display panel is provided on a light emergent side of the backlight module, the cover plate comprises a first surface deviating from the liquid crystal display panel and a second surface facing the liquid crystal display panel, the first surface being a concave surface, and the second surface being a convex surface protruding towards the liquid crystal display panel.

2. The curved-surface liquid crystal display according to claim 1, wherein a set of opposite sides of the frame are straight sides and wherein another set of opposite sides of the frame are curved sides.

3. The curved-surface liquid crystal display according to claim 2, wherein a curvature radius of the curved sides of the frame are the same as a curvature radius of the first surface.

4. The curved-surface liquid crystal display according to claim 3, wherein a shape of the frame matches with a shape of edges of the first surface where the frame is located.

5. The curved-surface liquid crystal display according to claim 1, wherein a curvature radius of the second surface is equal to a curvature radius of the first surface.

6. The curved-surface liquid crystal display according to claim 1, wherein a curvature radius of the second surface is smaller than a curvature radius of the first surface.

7. The curved-surface liquid crystal display according to claim 1, further comprising a support member provided along at least two opposite sides of the frame and located between the frame and the liquid crystal display panel, wherein the support member is of a strip structure.

8. The curved-surface liquid crystal display according to claim 7, wherein the cover plate is sandwiched between the support member and the frame.

9. The curved-surface liquid crystal display according to claim 1, further comprising a fixing plate, to fix the cover plate onto the frame.

10. The curved-surface liquid crystal display according to claim 9, wherein the fixing plate and the frame form a groove structure, and wherein the cover plate is fixed into the groove structure.

11. The curved-surface liquid crystal display according to claim 1, wherein the second surface is planar.

12. The curved-surface liquid crystal display according to claim 11, wherein the second surface is attached to the liquid crystal display panel, and wherein the cover plate is sandwiched between the frame and the liquid crystal display panel.

13. The curved-surface liquid crystal display according to claim 1, wherein there is a gap between the cover plate and the liquid crystal display panel.

14. The curved-surface liquid crystal display according to claim 3, further comprising a support member, provided along at least two opposite edges of the second surface of the cover plate and located between the cover plate and the liquid crystal display panel.

15. The curved-surface liquid crystal display according to claim 14, wherein a shape of the support member matches with a shape of the second surface.

16. The curved-surface liquid crystal display according to claim 5, further comprising a support member provided along at least two opposite edges of the second surface of the cover plate and located between the cover plate and the liquid crystal display panel.

17. The curved-surface liquid crystal display according to claim 6, further comprising a support member provided along at least two opposite edges of the second surface of the cover plate and located between the cover plate and the liquid crystal display panel.

18. The curved-surface liquid crystal display according to claim 6, further comprising a fixing plate to fix the cover plate onto the frame.

19. The curved-surface liquid crystal display according to claim 5, further comprising a fixing plate to fix the cover plate onto the frame.

* * * * *